Patented Sept. 3, 1940

2,213,904

UNITED STATES PATENT OFFICE 2,213,904

GEOCHEMICAL PROSPECTING

Thomas H. Dunn, Tulsa, Okla., assignor to Stanolind Oil and Gas Company, Tulsa, Okla., a corporation of Delaware No Drawing. Application July 22, 1938,
Serial No. 220,713

8 Claims. (Cl. 88—14)

This invention relates to a method of geochemical prospecting by means of the analysis of soil samples obtained near the surface of the earth to determine minute quantities of waxes contained therein.

It has been found that deep seated petroleum deposits are accompanied by wax-like compounds present in minute quantities in the surface soils overlying or in the vicinity of these deep seated petroleum deposits. I do not know the precise reason for this phenomenon but it may be due to the gradual accumulation of heavy compounds which diffuse upward with lighter hydrocarbon constituents which ultimately escape into the atmosphere, or, on the other hand, it may be due to the formation of heavy wax-like materials by such processes as polymerization and oxidation operating upon these lighter hydrocarbon constituents which have diffused upward from the deep seated oil and/or gas deposits. Whatever may be the correct theory to account for these wax-like deposits, which may be hydrocarbons, or oxidized hydrocarbon in character, the fact remains that their presence in surface soils is often correlatable with the presence of hydrocarbon deposits in the deeper geological formations.

It is an object of this invention to provide means and methods of geochemical prospecting involving the analysis of surface soils to determine qualitatively and quantitatively the presence of wax-like materials therein. A further object of my invention is to provide a new, improved, and rapid method for the analysis of soils, to determine waxes present in such soils. Other and more detailed objects, advantages, and uses of my invention will become apparent as the description thereof proceeds.

In practicing this invention, samples of soils are taken at depths of, for instance, a few inches beneath the surface, and are analyzed on the spot, or transported to a laboratory for analysis. Such samples can suitably be taken at spaced points along a survey line, or at spaced points distributed over the area to be surveyed.

As a first step, it is desirable to pulverize the soil sample, and to dry it in air, or by subjecting it to a temperature in moderate excess of the boiling point of water, for instance, a temperature of 220° F., in a drying oven.

This powdered and dried sample can be extracted with a suitable solvent, for instance by the use of a Soxhlet extraction apparatus. Thus, an 80 gram soil sample can be weighed into a Soxhlet thimble and extracted for four hours, using a condenser temperature of approximately 40° F. Following this extraction, the solvent contained in the flask, used in connection with the Soxhlet apparatus, is evaporated to a volume of 100 c. c., or in case the volume of material is less than 100 c. c., additional solvent is added until this volume is achieved.

The 100 c. c. sample is then transferred into a test tube with an optically flat bottom, for instance a test tube of the type provided with commercial photo-electric colorimeters, which are used to determine color by passing light of standard intensity through a standard column of the sample and measuring the intensity of the transmitted light by means of a photo-electric cell. The color intensity is determined in this type of colorimeter in micro-amperes as compared with a blank consisting of the filtered solvent without any soil wax in solution. This reading can be converted into parts per million by weight, by comparison with calibration charts which are the result of experimental work correlating this colorimetric method with a gravimetric method consisting in taking a sample of the solution of soil wax, evaporating it, and weighing the amount of soil wax residue remaining after the evaporation of the solvent.

It will be apparent that other methods of measuring the color density of the solution can be used, and that results of a qualitative, or semi-quantitative nature can be obtained by mere visual observation of the color density of the solvent extract containing the soil wax in solution. This color density is, of course, occasioned by the fact that the soil wax itself is definitely colored, the color typically being yellow. Instead of using a Soxhlet extraction apparatus to obtain the solvent extract, an alternative procedure, which is somewhat more rapid, can be used to advantage. Thus, for example, an 80 gram sample of the powdered and air dried soil can be introduced into a 200 c. c. Erlenmeyer flask; 180 c. c. of the solvent can be added and gently agitated, the stopper inserted in the flask and the whole allowed to stand for at least four hours, or preferably over night. The height of the liquid level in the flask can be marked with a gummed label, or otherwise.

After the sample has been allowed to stand with the solvent, the height of the liquid level can be observed, and if there has been any loss of solvent, the liquid level should be restored by the addition of fresh solvent. The next step is to decant most of the liquid into a clean graduate and read its volume immediately. This volume will typically be about 140 c. c. This decanted liquid is then filtered, for instance through a clean No. 40 Whatman filter paper, into a clean vessel. The solvent can then be evaporated off until a volume of 100 c. c. is reached, or more conveniently the solvent can be evaporated down to a volume of slightly less than 100 c. c. and the volume can then be brought up to 100 c. c. by the addition of fresh filtered solvent. This evaporation can suitably be conducted by the use of a hot water bath, or by merely allowing the vessel to stand while covered by a watch glass to exclude dust.

In any event, the solvent thus filtered is inserted into a test tube as previously indicated, and the color is determined as above described in connection with the Soxhlet extraction technique. However, in the method in which the sample is agitated with the solvent in an Erlenmeyer flask and subsequently decanted, it will be apparent that only a portion of the total soil wax extracted from the sample is contained in the decanted portion of the solvent. Thus, the determinations made by this technique should have applied to them a corrective factor the numerator of which is the total volume of solvent which was added to the soil, and the denominator of which is the volume of solvent decanted from the soil sample.

Various solvents can be used in connection with my new procedure, and the solvent used will depend somewhat upon the presence or absence in the soils being analyzed of material other than soil wax which might be soluble in the particular solvent selected. Carbon tetrachloride and other chlorinated solvents are suitable if the particular soils do not contain substantial quantities of materials other than soil wax soluble therein. Similarly, benzene and other aromatic organic solvents can be used, but in order to be certain that materials other than soil wax are not dissolved, it is desirable to use an aliphatic hydrocarbon solvent, since such solvents dissolve soil wax and do not dissolve other constituents of normal soils. While various hydrocarbon solvents ranging from the lower aliphatic hydrocarbons, for instance pentane, up through the light and heavy naphthas to such relatively non-volatile solvents as kerosene, can be used, I find it preferable to use a solvent having a volatility at least that of octane, and not greater than that of butane, since solvents lighter than butane are difficult to handle and have relatively low solvent powers for soil wax, while solvents heavier than octane are difficult to evaporate, and are likely to contain contaminants which may introduce errors into the colorimetric determination of soil wax content.

While I have described my invention in connection with certain specific embodiments thereof, it is to be understood that these are by way of illustration and not by way of limitation, and that I do not intend to be restricted thereby, but only to the scope of the appended claims.

I claim:

1. The method of geochemical prospecting which comprises collecting a plurality of surface soil samples from selected points on the terrain to be surveyed, extracting said samples with an organic solvent having a solvent action on soil waxes, examining the extracts colorimetrically under standardized conditions and determining the colors of said extracts with relation to a known standard of comparison, whereby the relative amounts of soil waxes present in said samples are determined and compared as indices to the presence of underlying hydrocarbon deposits.

2. A method, according to claim 1, in which the solvent is a chlorinated solvent.

3. A method, according to claim 1, in which the solvent is a hydrocarbon.

4. A method of geochemical prospecting which comprises extracting each of a series of soil samples, taken from selected points on the terrain to be surveyed, with an organic solvent which has a solvent action on soil waxes, bringing each of said extracts to a standard volume per unit of soil extracted, thereafter examining said extracts colorimetrically to determine their relative colors and determining by means of said relative colors, the relative amounts of soil waxes in said samples as an index to the presence of underlying hydrocarbon deposits.

5. A method, according to claim 4, in which the solvent is carbon tetrachloride.

6. A method, according to claim 4, in which the solvent is a hydrocarbon having a volatility not greater than that of butane and not less than that of octane.

7. A method of geochemical prospecting comprising taking soil samples from spaced points in the terrain to be surveyed, drying and pulverizing each of said samples, extracting each of said dried and pulverized soil samples with an organic solvent having a solvent action on soil waxes, removing insoluble materials from each of said solvent extracts, bringing the volume of each of said solvent extracts to a standard quantity and determining the relative amounts of soil wax present in said samples by comparing the colors of said solvent extracts.

8. A method of geochemical prospecting comprising taking soil samples from spaced points in the terrain to be surveyed, drying and pulverizing each of said samples, extracting each of said dried and pulverized soil samples with an organic solvent having a solvent action on soil waxes, removing insoluble materials from each of said solvent extracts, bringing the volume of each of said solvent extracts to a standard quantity, determining the color of each of said solvent extracts by passing light of standard intensity through a standard column of the solvent extract and measuring the intensity of the transmitted light by means of a photo-electric cell, and comparing the said colors, to determine the relative amounts of soil wax present in said extracts.

THOMAS H. DUNN.